(12) United States Patent
Long

(10) Patent No.: US 9,599,839 B2
(45) Date of Patent: Mar. 21, 2017

(54) EYEGLASSES WITH ROTATIONALLY SECURED CIRCULAR LENSES, LENS JIG AND METHOD OF JIG USE

(71) Applicant: Jeff Long, Broken Arrow, OK (US)

(72) Inventor: Jeff Long, Broken Arrow, OK (US)

( * ) Notice: Subject to any disclaimer, the term of this patent is extended or adjusted under 35 U.S.C. 154(b) by 148 days.

(21) Appl. No.: 14/216,441

(22) Filed: Mar. 17, 2014

(65) Prior Publication Data
US 2014/0268006 A1 Sep. 18, 2014

Related U.S. Application Data

(60) Provisional application No. 61/787,673, filed on Mar. 15, 2013.

(51) Int. Cl.
*G02C 1/00* (2006.01)
*G02C 1/06* (2006.01)
*B23B 47/28* (2006.01)

(52) U.S. Cl.
CPC .............. *G02C 1/06* (2013.01); *B23B 47/281* (2013.01); *Y10T 408/03* (2015.01); *Y10T 408/55* (2015.01)

(58) Field of Classification Search
CPC ... G02C 1/00; G02C 1/06; G02C 1/10; G02C 7/00; G02C 7/02; G02C 7/021; B24B 13/0055; B23B 47/28; B23B 47/284

USPC ...................... 351/41, 83, 86, 154, 158, 178
See application file for complete search history.

(56) References Cited

U.S. PATENT DOCUMENTS

| | | | | | |
|---|---|---|---|---|---|
| 1,355,535 | A | * | 10/1920 | Burgess | 351/65 |
| 1,383,872 | A | * | 7/1921 | Stevens | 351/96 |
| 1,433,482 | A | * | 10/1922 | Searles | 351/102 |
| 2007/0201002 | A1 | * | 8/2007 | Takeichi | 351/178 |

* cited by examiner

*Primary Examiner* — Huy K Mai
(74) *Attorney, Agent, or Firm* — John M. Behles

(57) ABSTRACT

Eyeglasses with rotationally secured circular lenses, lens rigs, and methods of use are provided herein. A pair of eyeglasses may include a circular first lens and a circular second lens, each having a lens peripheral surface. At least one of said first lens and said second lens has a line of astigmatism with a prescribed rotational position relative to a wearer eye. The glasses also have a frame having a circular first frame opening into which the first lens is mounted and a circular second frame opening into which the second lens is mounted, each frame opening having an inward frame opening peripheral surface. A lens rotational securing means for securing each of the lenses against rotation relative to said frame, such that the line of astigmatism is prevented from moving out of its prescribed rotational position within its frame opening.

8 Claims, 4 Drawing Sheets

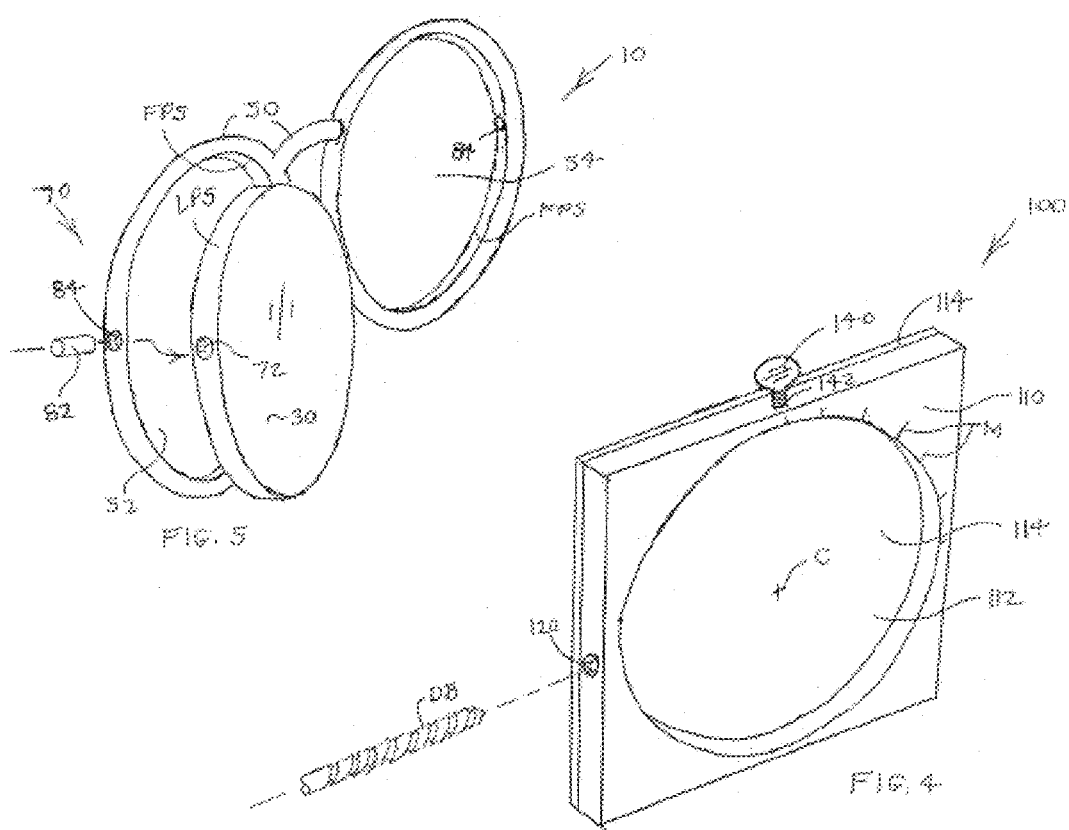

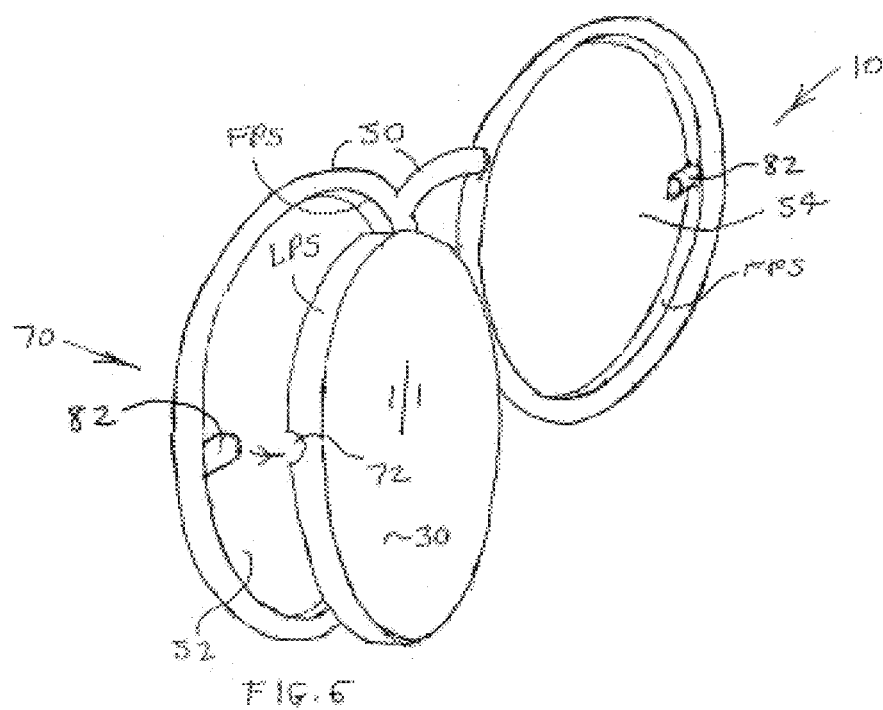

EYEGLASSES WITH ROTATIONALLY SECURED CIRCULAR LENSES, LENS JIG AND METHOD OF JIG USE

CROSS REFERENCE TO RELATED APPLICATION

This application claims the priority benefit of U.S. Provisional Application Ser. No. 61/787,673, filed on Mar. 15, 2013 titled "EYEGLASSES WITH ROTATIONALLY SECURED CIRCULAR LENSES, LENS JIG AND METHOD OF JIG USE", which is hereby incorporated by reference herein including all references cited therein.

BACKGROUND OF THE INVENTION

Field of the Invention

The present technology relates generally to the field of eyeglasses. More specifically the present technology relates to eyeglasses including circular first and second lenses, a frame having circular first and second frame openings into which the lenses are respectively mounted and lens rotational securing means for securing at least one of the first and second lenses against rotation out of its prescribed rotational position within the frame.

SUMMARY

The present technology accomplishes the above-stated objectives, as well as others, as may be determined by a fair reading and interpretation of the entire specification.

A pair of eyeglasses is provided, including a circular first lens and a circular second lens, each having a lens peripheral surface, where at least one of the first lens and the second lens has a line of astigmatism with a prescribed rotational position relative to a wearer eye; a frame having a circular first frame opening into which the first lens is mounted and a circular second frame opening into which the second lens is mounted, each of the frame openings having an inward frame opening peripheral surface; and lens rotational securing structures for securing each lens against rotation relative to the frame so that the line of astigmatism is prevented from moving out of its prescribed rotational position within its frame opening. The rotational securing means for each lens preferably includes a lens irregularity such as a lens notch along the lens peripheral surface and a corresponding frame irregularity such as a frame protrusion along the inward frame opening peripheral surface, so that each lens irregularity and corresponding frame irregularity mutually engage to prevent the lens from rotating relative to the frame.

A lens jig is provided for producing a notch in an eyeglass lens having a line of astigmatism according to a lens prescription, including a jig body having a lens receiving jig opening sized to closely receive a lens; rotational degree indicia on the jig body for alignment with a lens line of astigmatism so that a lens having a line of astigmatism and a lens peripheral surface can be inserted into the jig opening and rotated until the line of astigmatism is precisely positioned relative to degree indicia on the jig consistent with the lens prescription; and a drill port extending through the jig body to the jig opening and sized to receive a drill bit to bore a notch into the lens peripheral surface.

A method is provided of producing a lens notch in a peripheral surface of an eyeglass lens, comprising the steps of: providing a circular lens having a line of astigmatism and a lens peripheral surface; providing a lens jig comprising a jig body having a lens receiving jig opening sized to receive the lens, rotational degree indicia on the jig body adjacent to the jig opening such that the lens can be inserted into the jig opening and rotated until the line of astigmatism is positioned adjacent to degree indicia on the lens jig consistent with the lens prescription, and a drill port extending through the jig body to the jig opening and sized to receive a drill bit to bore a notch into the lens peripheral surface; fitting the lens into the jig opening; providing a drill having a drill bit with a bit diameter substantially matching an intended lens notch diameter; sliding the bit into the drill port until the bit abuts the lens peripheral surface; operating the drill to cause the bit to bore a notch into the lens peripheral surface; withdrawing the drill bit from the lens; and removing the lens from the jig opening.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 4 is front perspective view of the lens jig of FIG. 3 additionally including a lens body rear wall and a set screw, and showing a drill bit positioned for insertion into the drill port.

FIG. 5 is a perspective view of an eyeglass frame with the frame arms omitted, and a lens positioned for insertion into a frame opening, illustrating one version of the rotational securing means including a lens notch in the form of a radial bore in the lens peripheral surface, a pin passageway in the frame for alignment with the lens notch and a pin positioned for insertion through the radial pin passageway into the lens notch.

FIG. 6 is a view as in FIG. 5 illustrating a second version of the rotational securing means including a lens notch in the form of a semi-circular channel opening out of the lens rearward surface and a frame protrusion having a semi-circular forward surface for fitting into the channel as the lens is mounted in the frame opening.

DETAILED DESCRIPTION

Figure 1:
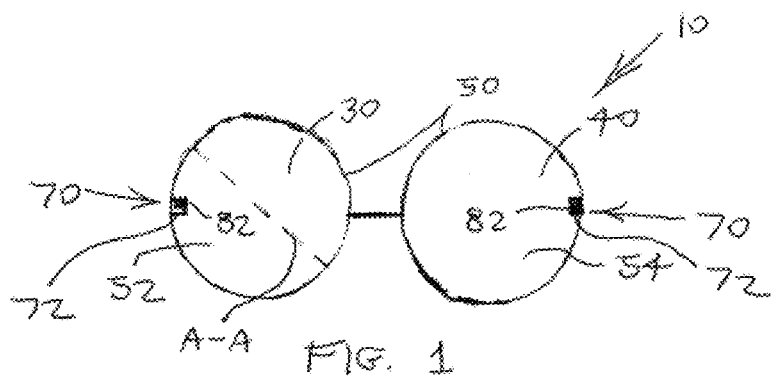
FIG. 1 is a front view of eyeglass frames with circular frame openings fitted with circular lenses and having the rotational securing means of the preferred embodiment.
Figure 2:
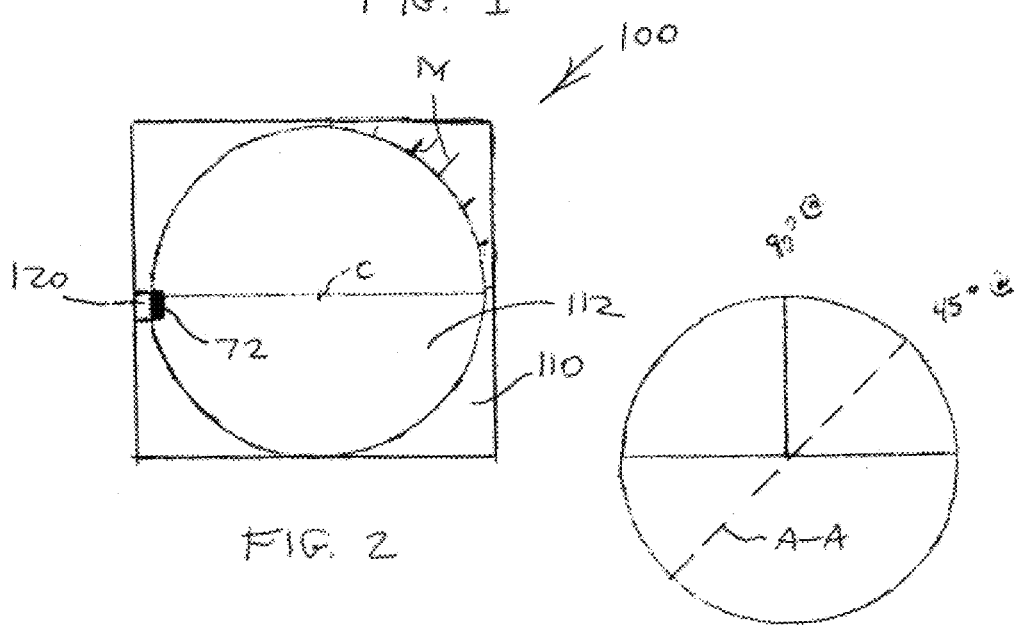
FIG. 2 is a front view of the lens jig of the present invention.
Figure 3:
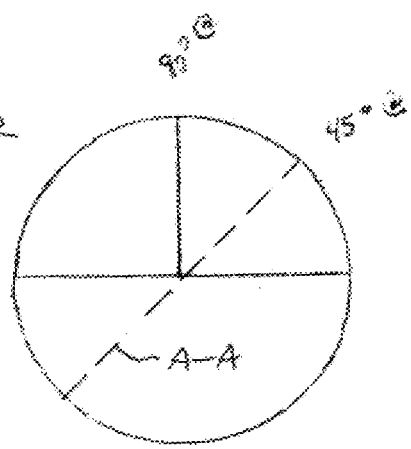
FIG. 3 is a schematic representation of a lens within the lens jig showing an exemplary line of astigmatism rotationally positioned for a given prescription with rotational positioning indicia.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

In general, the present technology relates to eyeglasses including circular first and second lenses, a frame having circular first and second frame openings into which the lenses are respectively mounted and lens rotational securing means for securing at least one of the first and second lenses against rotation out of its prescribed rotational position within the frame. This is important because a lens having a line of astigmatism that is even a few degrees out of its prescribed rotational position relative to the wearer eye can cause the wearer headaches and distort his or her vision.

Each lens rotational securing means includes a lens irregularity along the lens peripheral surface and a corresponding mirror image frame irregularity along the inward frame opening peripheral surface of its frame opening, such that each lens irregularity and corresponding frame irregularity fit together and mutually engage. The preferred lens irregularity is a lens notch, and the preferred frame irregularity is a frame protrusion matching the size and shape of and fitting into the lens notch.

A lens notching tool is provided in the form of a lens jig which removably mounts each lens and then positions and guides a rotating drill bit against a point on the lens peripheral surface to form a notch. The drill bit bores a lens notch into the lens peripheral surface at a location causing the lens to mount within the frame at a rotational position placing the line of astigmatism at its prescribed orientation. The lens jig includes a jig body in the form of a panel having a lens receiving jig opening passing through the panel, sized to closely receive the circumference of a lens.

A drill port extends through the jig body to the jig opening and preferably is directed radially relative to the center of the jig opening. The drill port is sized to closely receive a drill bit having a diameter appropriate for boring a notch of the size required to snugly receive the frame protrusion. Rotational indicia in the form of degree markings are provided on the jig body adjacent to the jig opening so that a given lens mounted in the jig can be rotated until its line of astigmatism is precisely positioned relative to a degree marking corresponding to the prescription prior to drilling the lens notch. A jig rear wall is provided for retaining and positioning a lens relative to the drill port.

A set screw optionally is provided which is mounted in a threaded set screw bore extending through the jig body to the jig opening. Like the drill port, the set screw bore preferably is oriented radially relative to the center of the jig opening. Rotating the set screw in one direction causes the set screw to advance toward the jig opening and into engaging contact with the peripheral surface of a lens mounted in the jig opening, so that the lens is releasibly secured within the jig body while the lens notch is bored. Rotating the set screw in the opposing direction causes the screw to retract away from the jig opening and thereby to release the lens. A method of operating the lens jig is also provided.

For context, there have long been eyeglasses having lenses that correct astigmatism. Such lenses include what may be termed a line of astigmatism. Part of the lens prescription is the required rotational position of the line of astigmatism of each lens within its frame opening, which places the line of astigmatism at a specified angle relative to the wearer eye. It is important that the lenses remain exactly in their prescribed rotational positions within the frame because a shift of only a few degrees can cause the wearer distorted vision and headaches. Most lenses and the frame openings into which they are mounted have peripheral shapes other than round, so that the lenses are incapable of slipping out of their prescribed rotational positions. Yet there are circumstances in which lenses and frame openings need to be circular, and as a result rotational slipping over time becomes an important problem.

One such circumstance is presented in economically depressed parts of the world where many people rely on donated eyeglasses and do not have regular access to eye care professionals. A philanthropic organization might endeavor to supply donated eyeglasses to people in such areas. Yet an obvious problem with donated eyeglasses is that the lens prescriptions typically do not exactly match the prescription of the recipient, and thus at best they only partially correct the vision of recipient. It is possible to provide packages of lenses ground to a wide variety of different prescriptions so that a suitable pair can be provided to an appropriate recipient. These, however, would have to be cut with a lens edger to fit the shape of the frame openings of each individual donated frame, making the eyeglasses prohibitively expensive for a charity to supply. What is needed are eyeglass frames all having like sized and shaped frame openings, so that a package of lenses all of the same size and shape, and ground to a variety of different prescriptions will fit any frame. What is further needed is for the line of astigmatism of each lens to be rotatable relative to the receiving frame opening to a position required by an individual prescription. What is still further needed is a way to hold the lenses against rotation from their prescribed positions.

The present technology provides eyeglasses in which the frame openings and lenses are circular and of matching diameters so that the lenses can be secured in the frames at any rotational position so that a lens having a line of astigmatism can be oriented to exactly the angle relative to the wearer eye to meet the lens prescription requirements.

Eyeglasses of the present technology may also have a lens rotational securing means which permit each lens to be mounted so that the lens line of astigmatism is fixedly secured at its prescribed rotational position relative to the frame and thus relative to the corresponding wearer eye and therefore cannot slip out of position over time, thereby assuring that proper correction is reliably and precisely maintained.

The present technology also provides for a tool for modifying each lens to seat and lock at its individually prescribed rotational position within the frame, and a method of using the tool. These lenses, frames, and tools are inexpensive, and furthermore the tool is easy to use in conjunction with a conventional electric or manual drill fitted with a bit.

Referring to FIGS. 1-7, a pair of eyeglasses 10 is disclosed including a circular first lens 30 and a circular second lens 40 and a frame 50 having a circular first frame opening 52 and a second frame opening 54 into which the lenses 30 and 40 are respectively mounted. Rotational securing means 70 are provided for each lens 30 and 40 for securing the lens against rotation relative to the frame 50, so that a line of astigmatism A-A in the lens cannot slip within its frame opening 52 or 54 out of its prescribed rotational position relative to a corresponding wearer eye. This is important, as previously noted, because a lens having a line of astigmatism that is even a few degrees out of its prescribed rotational position can cause the wearer headaches and distort his or her vision.

Each lens rotational securing means 70 includes a lens irregularity 72 along its lens peripheral surface LPS and a corresponding mirror image or negative frame irregularity 82 along the inward frame opening peripheral surface FPS of its respective frame opening 52 or 54. Each lens irregularity 72 and its corresponding frame irregularity 82 mesh together and mutually engage to prevent the lens 30 or 40 from rotating relative to the respective frame opening 52 or 54. The preferred lens irregularity is a lens notch 72, and the preferred frame irregularity is a frame protrusion 82 matching the size and shape of the lens notch 72.

Frames 50 can be mass produced to have identically shaped and located frame protrusions 82 within their respective frame openings 52 and 54, so that lens rotational orientation is determined entirely by the location of the lens notch 72 in each individual lens 30 or 40. Each lens 30 or 40 therefore preferably is notched individually to place its line of astigmatism A-A at its prescribed rotational position within the frame 50.

If the lens notch 72 is a circular bore in the lens peripheral surface LPS, for example, then the frame protrusion 82 is a circular pin 82 slidably mounted within a pin passageway 84 in the frame 50 which opens laterally into the given frame opening 52 or 54. See FIG. 5. As a result, the pin 82 can be retracted out of the frame opening 52 or 54 so that the lens 30 or 40 can be fitted into the frame opening 52 or 54. The lens notch 72 is aligned with the pin 82, and the pin 82 is then slid into the lens notch 72. If the lens notch 72 is a semi-circular channel opening out of the rearward surface of a lens 30 or 40 and extending through the lens peripheral surface LPS, a frame protrusion 82 is provided having a semi-circular forward surface which fits into the lens notch 72 as the lens 30 or 40 is seated in its frame opening 52 or 54. See FIG. 6.

It is alternatively contemplated, though less preferred, that the lens notch 72 be recessed into the frame opening 52 or 54 and that the protrusion 82 be part of the lens 30 or 40. A lens edger might be provided and programmed to cut the protrusion 82 at the lens peripheral surface LPS.

Lens Notching Tool

A lens notching tool is provided in the form of a lens jig 100 which removably mounts each lens 30 or 40 and then positions and guides a rotating drill bit DB against a point on the lens peripheral surface LPS to form a lens notch 72. See FIG. 4. The drill bit DB bores a lens notch 72 into the lens peripheral surface LPS at the needed location to mount the lens 30 or 40 within the frame 50 so that the rotational position of the line of astigmatism A-A is consistent with the lens prescription. The lens jig 100 includes a jig body 110 in the form of a panel having a lens receiving jig opening 112 passing through the panel and sized to closely receive the circumference of a lens 30 or 40. A drill port 120 extends through the jig body 110 to the jig opening 112 and preferably is directed radially relative to the center C of the jig opening 112. The drill port 120 is sized to closely receive the drill bit DB having the appropriate diameter to bore a lens notch 72 of the size required to snugly receive the frame protrusion 82. Rotational indicia in the form of degree markings M are provided on the jig body 110 adjacent to the jig opening 112 so that the given lens 30 or 40 mounted in the jig 100 and can be rotated until its line of astigmatism A-A is precisely positioned relative to a degree marking M corresponding to the prescription. A jig rear wall 114 preferably is provided for retaining and positioning a lens 30 or 40 relative to the drill port 120.

A set screw 140 optionally is provided which is mounted in a threaded set screw bore 142 extending through the jig body 110 to the jig opening 112. The set screw bore 142 preferably is oriented radially relative to the center C of the jig opening 112. Rotating the set screw 140 in one direction causes the set screw 140 to advance toward the jig opening 112 and into engaging contact with the lens peripheral surface LPS of a lens 30 or 40 mounted in the jig opening 112, so that the lens 30 or 40 is releasibly secured within the jig body 110. Rotating the screw 140 in the opposing direction causes the screw 140 to retract away from the jig opening 112 and thereby to release the lens 30 or 40.

Figure 7:
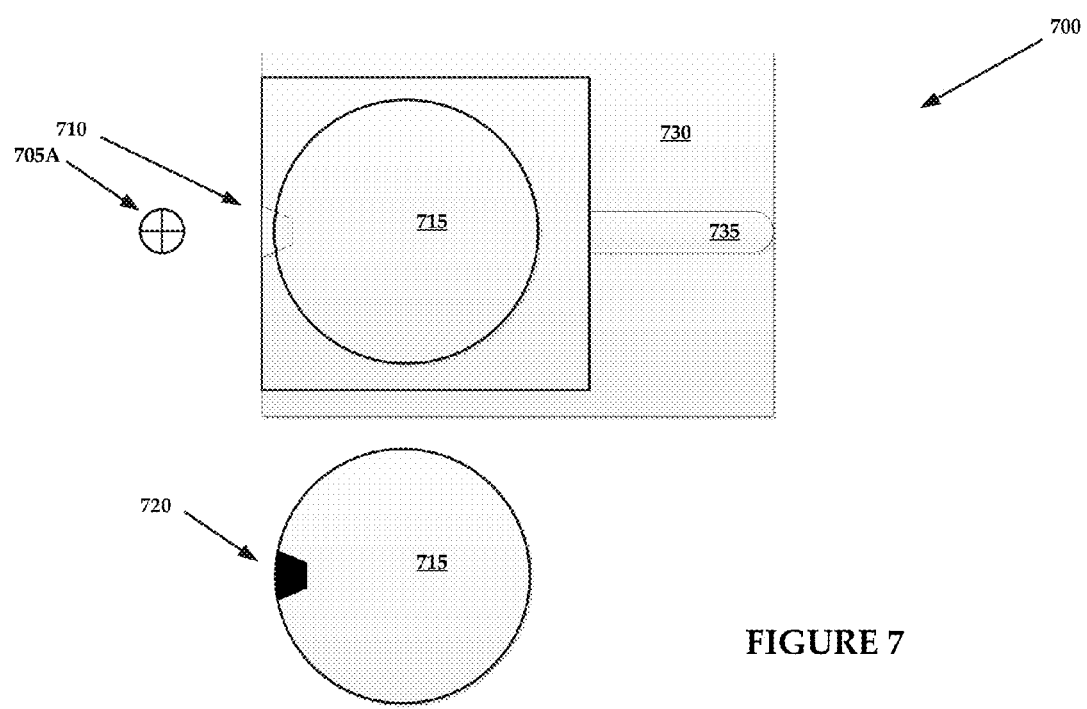
FIG. 7 is another embodiment of a jig that includes a jig body having a notch.

FIG. 7 is another embodiment of a jig 700 that includes a jig body 705 having a notch 710. When a lens 715 is placed into the jig body 705, a portion of an edge of the lens 715 is positioned within the notch 710. When the jig 700 is moved into proximity with a drill bit 705A that is turning perpendicularly to the lens 715, a notch 720 is formed into the lens 715. This notch 720 is configured to mate with a protrusion or pin in a frame of a pair of glasses, as described above. In some instances, the jig 700 can be mounted on a platform 730 that includes a track 735. The jig can slide laterally along the track 735 to bring the lens into contact with the drill bit.

Method

In practicing the invention, the following method may be used. A method of using the lens jig 100 to notch a lens 30 or 40 includes the steps of: providing the above lens jig 100 having a jig opening 112 sized to receive the lens 30 or 40 of a given diameter; providing a circular lens 30 or 40 ground to match the prescription requirements of a given recipient; fitting the lens 30 or 40 into the jig opening 112; providing a drill fitted with a drill bit DB having a bit diameter matching the required lens notch 72 diameter; inserting the bit DB into the drill port 120 until the drill bit DB bears against the lens peripheral surface LPS; operating the drill to cause the drill bit DB to bore a lens notch 72 into the lens peripheral surface LPS; removing the drill bit DB from the drill port 120 and removing the lens 30 or 40 from the jig 100. The lens 30 or 40 is then placed into its corresponding frame opening 52 or 54 so that the lens notch 72 registers with and is engaged by, or is positioned to be engaged by the protrusion 82 in the frame opening. In the lens jig 100 of FIG. 5, the protrusion pin 82 is inserted through the frame 50 until it protrudes into the lens notch 72.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A lens jig for producing a notch in an eyeglass lens having a line of astigmatism, comprising:
    a jig body having a lens receiving jig opening sized to receive a lens;
    rotational degree indicia on said jig body for alignment with a lens line of astigmatism such that a lens having a line of astigmatism and a lens peripheral surface can be inserted into said jig opening and rotated until the line of astigmatism is precisely positioned relative to degree indicia on the jig, consistent with the lens prescription;
    and a drill port extending through said jig body to said jig opening and sized to receive a drill bit to bore a notch into the lens peripheral surface.

2. The lens jig of claim 1, wherein said jig opening has a center and wherein said drill port is oriented substantially radially relative to the center of said jig opening.

3. The lens jig of claim 1, additionally comprising:
    a set screw,
    and a threaded set screw bore extending through said jig body and opening into said jig opening.

4. The lens jig of claim 3, wherein said set screw bore is oriented substantially radially relative to the center of said jig opening.

5. The lens jig of claim 1, wherein said jig body comprises a panel and wherein said jig opening passes through said panel.

6. The lens jig of claim 5, additionally comprising a jig rear wall extending behind and at least partly across said jig opening for retaining and positioning a lens seated in said jig opening.

7. A method of producing a lens notch in a peripheral surface of an eyeglass lens, comprising the steps of:
    providing a circular lens having a line of astigmatism and a lens peripheral surface;
    providing a lens jig comprising a jig body having a lens receiving jig opening sized to receive the lens, rotational degree indicia on the jig body adjacent to the jig opening such that the lens can be inserted into said jig opening and rotated until the line of astigmatism is positioned to correspond to degree indicia on the lens jig consistent with the lens prescription, and a drill port extending through said jig body to the jig opening and sized to receive a drill bit to bore a notch into the lens peripheral surface;
    fitting the lens into the jig opening;
    providing a drill having a drill bit with a bit diameter substantially matching an intended lens notch diameter;
    sliding the bit into the drill port until the bit abuts the lens peripheral surface;
    operating the drill to cause the bit to bore a notch into the lens peripheral surface;
    withdrawing the drill bit from the lens;
    and removing the lens from the jig opening.

8. A lens jig for producing a notch in an eyeglass lens having a line of astigmatism, comprising:
    a jig body having a lens receiving jig opening sized to receive a lens;
    rotational degree indicia on said jig body for alignment with a lens line of astigmatism such that a lens having a line of astigmatism and a lens peripheral surface can be inserted into said jig opening and rotated until the line of astigmatism is precisely positioned relative to degree indicia on the jig, consistent with the lens prescription;
    and a port extending through said jig body to said jig opening and sized to receive a means for boring a notch into the lens peripheral surface.

\* \* \* \* \*